United States Patent
Yang et al.

(10) Patent No.: US 11,422,750 B2
(45) Date of Patent: Aug. 23, 2022

(54) COMPUTER PROGRAM PRODUCT, SYSTEM, AND METHOD TO MANAGE ACCESS TO STORAGE RESOURCES FROM MULTIPLE APPLICATIONS

(71) Applicant: INTEL CORPORATION, Santa Clara, CA (US)

(72) Inventors: Ziye Yang, Shanghai (CN); Gang Cao, Shanghai (CN); Cunyin Chang, Shanghai (CN); Changpeng Liu, Shanghai (CN); James Harris, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 16/643,470

(22) PCT Filed: Sep. 27, 2017

(86) PCT No.: PCT/CN2017/103668
§ 371 (c)(1),
(2) Date: Feb. 28, 2020

(87) PCT Pub. No.: WO2019/061072
PCT Pub. Date: Apr. 4, 2019

(65) Prior Publication Data
US 2021/0072927 A1  Mar. 11, 2021

(51) Int. Cl.
*G06F 3/06* (2006.01)
*G06F 9/50* (2006.01)

(52) U.S. Cl.
CPC ............ *G06F 3/0664* (2013.01); *G06F 3/061* (2013.01); *G06F 3/0679* (2013.01); *G06F 9/5016* (2013.01); *G06F 9/5077* (2013.01)

(58) Field of Classification Search
None
See application file for complete search history.

(56) References Cited

U.S. PATENT DOCUMENTS

| 8,578,106 | B1 | 11/2013 | Shapiro |
| 2009/0031303 | A1* | 1/2009 | Frank ................ G06F 12/1475 718/1 |

(Continued)

FOREIGN PATENT DOCUMENTS

| CN | 1237252 | 12/1999 |
| CN | 105446813 | 3/2016 |
| CN | 105579961 | 5/2016 |

OTHER PUBLICATIONS

Extended European Search Report for Patent Application No. 17927124.2, dated Apr. 2, 2021, 11 pages.

(Continued)

*Primary Examiner* — Jane Wei
(74) *Attorney, Agent, or Firm* — Compass IP Law PC (57) ABSTRACT

A computer program product, system, and method to manage access to storage resources from multiple applications. A plurality of virtual controllers is generated in a host memory space. Each virtual controller includes at least one virtual namespace that maps to a physical namespace in a physical controller. Applications are assigned to the virtual controllers. For each application of the applications assigned one of the virtual controllers, a virtual submission queue is generated to communicate with the virtual controller assigned to the application. An Input/Output (I/O) request to a target virtual namespace in one of the virtual submission queues is added to a physical submission queue for the physical controller having the physical namespace for which the target virtual namespace was generated.

18 Claims, 5 Drawing Sheets

(56) References Cited

U.S. PATENT DOCUMENTS

| | | | |
|---|---|---|---|
| 2010/0037096 | A1 | 2/2010 | Bum et al. |
| 2014/0164676 | A1 | 6/2014 | Borchers et al. |
| 2015/0237140 | A1 | 8/2015 | Murphy et al. |
| 2015/0319237 | A1* | 11/2015 | Hussain .................. G06F 3/061 709/217 |
| 2017/0316006 | A1* | 11/2017 | Shukla .................. G06F 16/248 |

OTHER PUBLICATIONS

International Preliminary Report on Patentability for International Application No. PCT/CN2017/103668, dated Apr. 9, 2020, 5 pp.

Machine Translation of CN Publication No. 1237252, published Dec. 1, 1999, 16 pp.

Machine Translation of CN Publication No. 105446813, published Mar. 30, 2016, 34 pp.

Machine Translation of CN Publication No. 105579961, published May 11, 2016, 25 pp.

International Search Report and Written Opinion for International Application No. PCT/CN2017/103668, dated Jun. 27, 2018, 9 pp.

Intel Corporation, "SPDK: NVMe Driver", [online], [Retrieved on Sep. 4, 2017], retrieved from the Internet at <URL: http://www.spdk.io/doc/nvme.html>, 4 pp.

Intel Corporation, "SPDK: Storage Performance Development Kit", [online] [Retrieved on Sep. 4, 2017], retrieved from the Internet at < URL: http://www.spdk.io/doc/>, 112 pp.

Jonathan S., "Introduction to the Storage Performance Development Kit (SPDK)", [online] Updated Dec. 5, 2016, [Retrieved on Sep. 4, 2017], Retrieved from the Internet at <URL: https://software.intel.com/en-us/articles/introduction-to-the-storage-perfo . . . >, 6 pp.

Luse, P., "Storage Performance Development Kit", [online], Sep. 1, 2017, [Retrievewd on Sep. 4, 2017], Retrieved from the Internet at <URL: http://www.spdk.io/>, 2 pp.

OSR Open System Resources, Inc., "Introduction to NVMe Technology", [online] © 2017, [Retrieved on Sep. 4, 2017], Retrieved from the Internet at <URL: https://www.osr.com/nt-insider/2014-issue4/introduction-nvme-technology/>, 3 pp.

* cited by examiner

COMPUTER PROGRAM PRODUCT, SYSTEM, AND METHOD TO MANAGE ACCESS TO STORAGE RESOURCES FROM MULTIPLE APPLICATIONS

TECHNICAL FIELD

Embodiments described herein generally relate to a computer program product, system, and method to manage access to storage resources from multiple applications.

BACKGROUND

Non-Volatile Memory Express (NVMe) is a logical device interface (http://www.nvmexpress.org) for accessing non-volatile storage media attached via a Peripheral Component Interconnect Express (PCIe) bus (http://www.pcisig.com) or via other transport options, such as over Fibre Channel and Remote Direct Memory Access (RDMA) using NVMe over Fabrics (NVMe-oF). The non-volatile storage media may comprise a flash memory and solid solid-state drives (SSDs). NVMe is designed for accessing low latency storage devices in computer systems, including personal and enterprise computer systems, and is also deployed in data centers requiring scaling of thousands of low latency storage devices. The Storage Performance Development Kit (SPDK) provides a user space NVMe driver library of Application Programming Interfaces (APIs) that applications directly call to access the NVMe driver and NVMe storage devices, to allow for direct, zero-copy data transfer to and from NVME storage devices, such as SSDs. The SPDK NVMe drivers execute in the user space, as opposed to the kernel space, to provide improved performance and minimize processor usage.

There is a need in the art for improved techniques for multiple processes to share storage devices.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

Sharing the NVMe driver in the user space with multiple applications may not be efficient if multiple independent applications can access all of the NVMe devices, which may result in overburdening certain of the NVMe devices being accessed by multiple applications in a single host. Further, sharing the NVMe driver may raise security and isolation issues because if multiple applications have unfettered access to the same controller, they can each read and write any data on the controller with no isolation between those applications.

One technique to support multiple processes sharing I/O resources involves having a kernel driver manage access to the NVMe devices. However, this option does not realize the performance benefits of running the NVMe driver in the user space. Another technique for processes to share storage devices is to bifurcate drivers in the user and kernel space, where the NVMe devices are initialized by the kernel, but some NVMe Input/Output (I/O) queues and namespaces are managed in user space drivers. In another solution, multiple processes share an NVMe device via a master slave model, where a process will be started as the master process, to initialize the physical NVMe devices via an NVMe library, i.e., spdk_nvme_probe. All other processes are slave process if using the physical NVMe controller and call an spdk_nvme_probe API in the SPDK library to search the shared memory to determine whether the device is already initialized or not. If already initialized, the processes will not initialize the device again. This method has the drawback of not guaranteeing expected quality of service levels among the multiple processes while performing I/O operations.

Described embodiments provide improvements to storage device driver computer technology that allows multiple processes to share storage devices by generating a plurality of virtual controllers, including virtual namespaces that each map to a physical namespace in a physical controller of one of the storage devices, and assigning each application to a virtual controller. A virtual submission queue is generated for the application to use to communicate with the virtual controller assigned to the application. In this way, applications access to physical devices, such as the physical controllers and physical namespaces, is controlled and managed by assigning applications to a virtual controller and providing virtual submission queues that direct application I/O requests to the assigned virtual controller. Described embodiments further enforce quality of service levels by having a separate process, such as an I/O service layer, which may also operate in the user space, process I/O requests from applications to virtual namespaces by accessing the I/O requests in the virtual submission queues according to priorities related to the quality of service levels guaranteed to the applications using the virtual submission queues.

With described embodiments, the storage driver and all the resources to access the storage devices, such as the controller and submission queues, are virtualized in the user space to manage application access to the storage devices so as to prevent uneven distribution of accesses by the applications to the storage devices. Thus, application access is managed to avoid overloading certain storage devices and to guarantee quality of service levels assigned to the applications by managing the processing of the application I/O requests from the virtual submission queues according to priorities assigned to applications to implement their expected quality of service levels. A quality of service level may be assigned to an application based on its I/O throughput or the importance of tasks performed by the application, e.g., mission critical, not critical, etc. Further, because the storage driver, storage device queues and other device driver data structures are implemented in the user space, described embodiments further realize the performance benefits from running all the storage device driver and management operations in the user space, while at the same efficiently managing multiple applications access to storage resources in accordance with expected quality of service levels.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
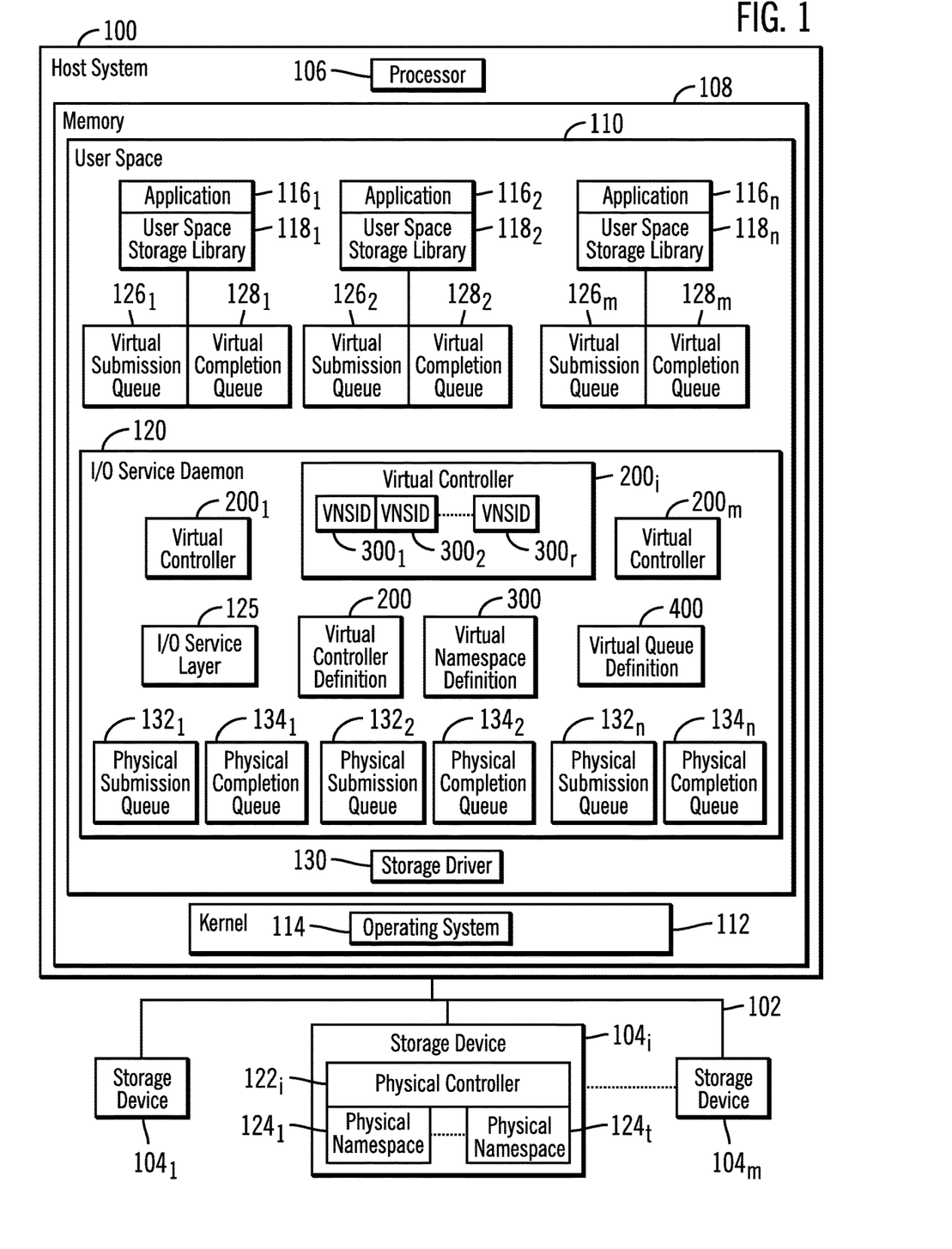
FIG. 1 illustrates an embodiment of a storage environment

FIG. 1 illustrates an embodiment of a host system 100 that communicates over a bus 102, such as a Peripheral Component Interconnect Express (PCIe) bus, with multiple storage devices $104_1 \ldots 104_m$. Alternatively, the bus 102 may represent other transport options, such as RDMA and Fibre Channel, etc. The host 100 includes a processor 106, such as having one or more processing cores, and a system memory 108 in which processes and applications execute in a user space 110 and a kernel space 112 in which an operating system 114 executes. The user space 110 includes a plurality of executing applications $116_1, 116_2 \ldots 116_n$. Each application may execute functions in a user space storage library $118_1, 118_2 \ldots 118_n$ to interact with an Input/Output (I/O) service daemon 120, which is also implemented in the user space 110, to access namespaces and partitions of namespaces configured in the storage devices $104_1, 104_2 \ldots 104_m$.

Each of the storage devices $104_1 \ldots 104_m$ may include, as shown with respect to storage device $104_i$, a physical controller $122_i$ to perform storage device $104_i$ operations, and one or more physical namespaces $124_1 \ldots 124_t$. A physical namespace comprises a quantity of non-volatile memory that may be formatted into logical blocks. When formatted, a namespace of size n is a collection of logical blocks with logical block addresses from 0 to (n−1). The namespaces may further be divided into partitions or ranges of addresses. The physical namespaces $124_1, \ldots, 124_t$ are identified by a namespace identifier (NSID) used by the physical controller $122_i$ to provide access to the namespace $120_1, \ldots 120_r$. The address space of each of the namespaces in the storage devices $104_1 \ldots 104_m$ may be divided into one or more namespaces partitions, where each partition comprises a subset of addresses in a physical namespace $120_1, \ldots 120_r$.

The I/O service daemon 120 includes an I/O service layer 125 comprising a process to handle user space storage library $118_i$ calls from the applications $116_1, 116_2 \ldots 116_n$ and to process I/O requests from the applications $116_1, 116_2 \ldots 116_n$. The I/O service layer 125 configures virtual controllers $200_1, 200_2 \ldots 200_m$ in the user space 110 to represent groupings of the virtual namespaces (VNSIDs) $300_1, 300_2 \ldots 300_r$, such as shown in virtual controller $200_i$. The I/O service layer 125 generates virtual submission queues $126_1, 126_2 \ldots 126_m$ the applications $116_1, 116_2 \ldots 116_n$ use to submit I/O requests to virtual namespaces in the virtual controllers $200_1, 200_2 \ldots 200_m$ to which the applications $116_1, 116_2 \ldots 116_n$ submitting the requests are assigned. The I/O service layer 125 further generates virtual completion queues $128_1, 128_2 \ldots 128_m$ through which the storage devices $104_1, 104_2 \ldots 104_m$ return completion and status for I/O requests submitted through the corresponding virtual submission queues $126_1, 126_2 \ldots 126_m$. The I/O service layer 125 maintains virtual controller definitions 200 of the generated virtual controller $200_1, 200_2 \ldots 200_m$, virtual namespace definitions 300 of the virtual namespaces (VNSID) and a virtual queue pair assignment 400 indicating an assignment of virtual submission queue $126_1, 126_2 \ldots 126_m$ and virtual completion queue $128_1, 128_2 \ldots 128_m$ pairs to the applications $116_1, 116_2 \ldots 116_n$.

The user space 110 further includes a storage driver 130 comprising programs and functions to provide an interface between the operating system 114 and the storage devices $104_1, 104_2 \ldots 104_m$. The storage driver 130 upon discovery of the storage devices $104_1, 104_2 \ldots 104_m$ may generate for each of the storage devices $104_1, 104_2 \ldots 104_m$ physical submission queue $132_1, 132_2 \ldots 132_m$ and physical completion queue $134_1, 134_2 \ldots 134_n$ pairs. The I/O service layer 125 accesses I/O requests from the virtual submission queues $126_1, 126_2 \ldots 126_m$ and adds to the corresponding physical submission queues $132_1, 132_2 \ldots 132_n$. The physical controllers $122_i$ accesses I/O requests directed to a physical namespace maintained by the physical controller $122_i$ from a corresponding physical submission queue $132_i$. Upon processing an I/O request from a physical submission queue $132_i$, the physical controller $122_i$ returns complete or status to the corresponding physical completion queue $134_i$ used by the physical controller $122_i$, which is then forwarded to the virtual completion queue $128_i$ associated with the physical completion queue 134 to be returned to the application $116_i$ that initiated the request.

In one embodiment, the user space storage library $118_1, 118_2 \ldots 118_n$, I/O service daemon 120, the storage driver 130, and the storage devices $104_1, 104_2 \ldots 104_m$ may implement the Non-Volatile Memory Express (NVMe) protocol and the bus 102 may comprise a Peripheral Component Interconnect Express (PCIe) bus. In alternative embodiments, other storage protocols may be implemented in the components.

The storage devices $104_1, 104_2 \ldots 104_m$ may comprise electrically erasable and non-volatile memory cells, such as flash storage devices, solid state drives, etc. For instance, the storage devices $104_1, 104_2 \ldots 104_m$ may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage devices $104_1, 104_2 \ldots 104_m$ may also comprise, but not limited to, ferroelectric random-access memory (FeTRAM), nanowire-based non-volatile memory, three-dimensional (3D) cross-point memory, phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The storage devices $104_1, 104_2 \ldots 104_m$ may also comprise a magnetic storage media, such as a hard disk drive etc. The host system memory 108 may comprise a non-volatile or volatile memory type of device known in the art, such as a Flash Memory, a non-volatile dual in-line memory module (NVDIMM), Dynamic Random Access Memories (DRAMs), etc., or may also comprise, but not limited to, ferroelectric random-access memory (FeTRAM), nanowire-based non-volatile memory, three-dimensional (3D) cross-point memory, phase change memory (PCM), memory that incorporates memristor technology. Magnetoresistive random-access memory (MRAM), Spin Transfer Torque (STT)-MRAM, a single level cell (SLC) Flash memory and other electrically erasable programmable read only memory (EEPROM) type devices, such as magnetic storage media, such as a hard disk drive etc.

Figure 2:
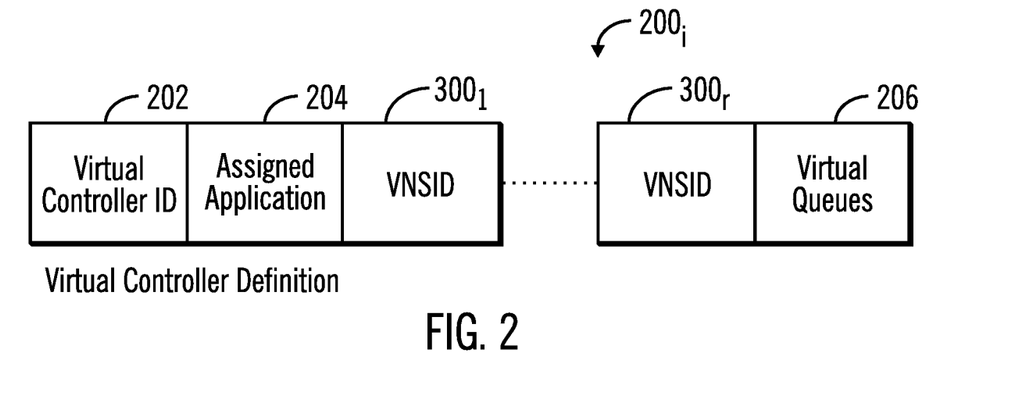
FIG. 2 illustrates an embodiment of a virtual controller definition to represent and define a virtual controller.

FIG. 2 illustrates an embodiment of an instance of a virtual controller definition $200_i$ to define and represent one of the virtual controllers $200_i$ configured in the host 100, and includes: a virtual controller (VC) identifier 202; an assigned application 204 comprising one of the applications $116_1$, $116_2$ ... $116_n$ assigned to the virtual controller 202 or indication of no application yet assigned; one or more virtual namespaces $300_1$ ... $300_r$, identified by a VNSID, assigned to that virtual controller 202; and virtual queues 206 assigned to the virtual controller 202, such as a virtual submission queue $126_i$ and virtual completion queue $128_i$ pair. In certain embodiments, only one application $116_i$ may be assigned to a virtual controller $200_i$ to submit read and write requests to the virtual namespaces $300_1$ ... $300_r$, assigned to the virtual controller $200_i$ using the virtual queues 206. The applications $116_1$, $116_2$ ... $116_n$ may also submit additional request types, such as a trim/deallocate request to instruct a storage device $104_1$, $104_2$ ... $104_m$ when specific blocks of data are no longer in use and may be garbage collected.

Virtual controllers $200_i$ may be configured beforehand to include one or more virtual namespaces $300_1$ ... $300_r$, where the virtual namespaces $300_1$ ... $300_r$ assigned to one virtual controller may map to physical namespaces $124_i$ in one or multiple storage physical controllers/storage devices. In this way, there may be one-to-one mappings of virtual controllers to physical controllers, i.e., a virtual controller only has virtual namespaces mapping to physical namespaces in only one physical controller, or mappings of one virtual controller to many physical controllers, i.e., a virtual controller has virtual namespaces mapping to physical namespaces in multiple physical controllers/storage devices.

Figure 3:
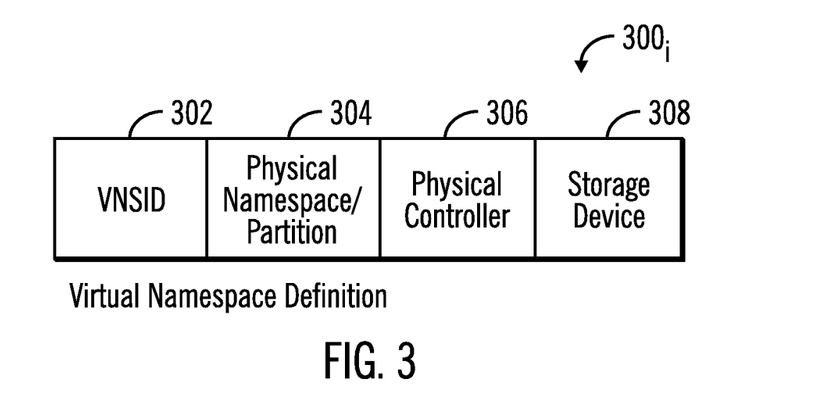
FIG. 3 illustrates a virtual namespace definition to represent and define a virtual namespace that maps to a physical namespace/partition in a storage device.

FIG. 3 illustrates an embodiment of an instance of a virtual namespace definition $300i$, and includes: a virtual namespace identifier (VNSID) 302; an assigned physical namespace/partitions 304 a physical controller 306 having the assigned physical namespace/partition 304; and the storage device 308 having the physical controller 306 and assigned physical namespace/partition 304. In certain embodiments, there may be one or more physical namespaces assigned to one virtual namespace definition 302.

Figure 4:
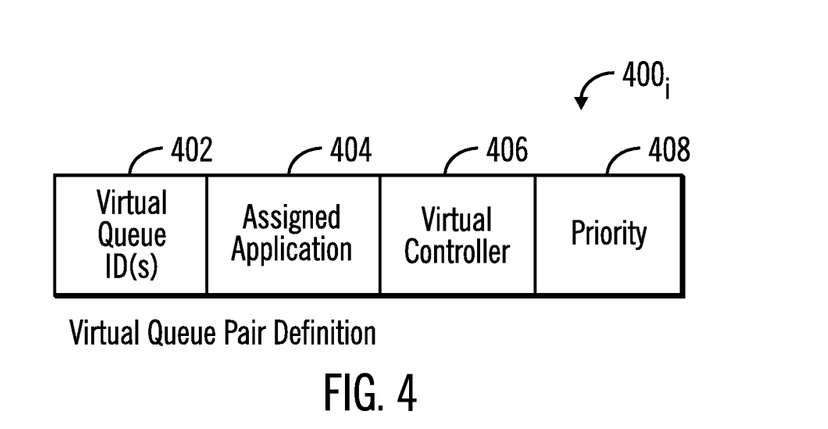
FIG. 4 illustrates an embodiment of a virtual queue pair definition for a virtual submission queue for I/O requests to a virtual controller.

FIG. 4 illustrates an embodiment of an instance of a virtual queue definition $400_i$ for one or more virtual queues, e.g., virtual submission queue $126_i$ and virtual completion queue $128_i$, generated for an application $116_i$ to use to submit I/O requests to a virtual controller $200_i$ to which the application $116_i$ is assigned. The virtual queue definition $400_i$ includes virtual queue identifier 402 for one or more virtual queues; an assigned application 404 to which the virtual queue(s) 402 is assigned; the virtual controller 406 for which the virtual queue(s) 402 are generated; and a priority 408 associated with the virtual queue(s) 402 indicating a priority at which the I/O service layer 125 processes I/O requests in the virtual submission queues $126i_1$, $126_2$ ... $126_m$ to add to the corresponding physical submission queues $132_1$, $132_2$ ... $132_n$ for access by the physical controllers $122_i$.

Additional configurations are possible. For instance, the same defined virtual namespace identifier that maps to one physical namespace may be included in two separate virtual controllers to allow for the sharing of a virtual namespace and the mapped physical namespace. Further, one virtual namespace can map to different physical namespaces or different partitions within a namespace in the same or different storage devices. A virtual namespace mapping to a physical namespace/partition may be included in multiple virtual controllers $200_i$ to allow sharing of the virtual namespace by multiple hosts.

The applications $116_1$, $116_2$ ... $116_n$ may address a virtual namespace, by including a virtual subsystem (VSS) name, the virtual controller (VC) name, and the virtual namespace identifier (VNSID) in a combined address, such as VSSname.VCname.VNSID. In this way, virtual namespace IDs in different virtual controllers may have the same number identifier but point to different physical namespaces/partitions. Alternatively, the same virtual namespace IDs in different virtual controllers may point to the same shared physical namespace/partition.

Figure 5:
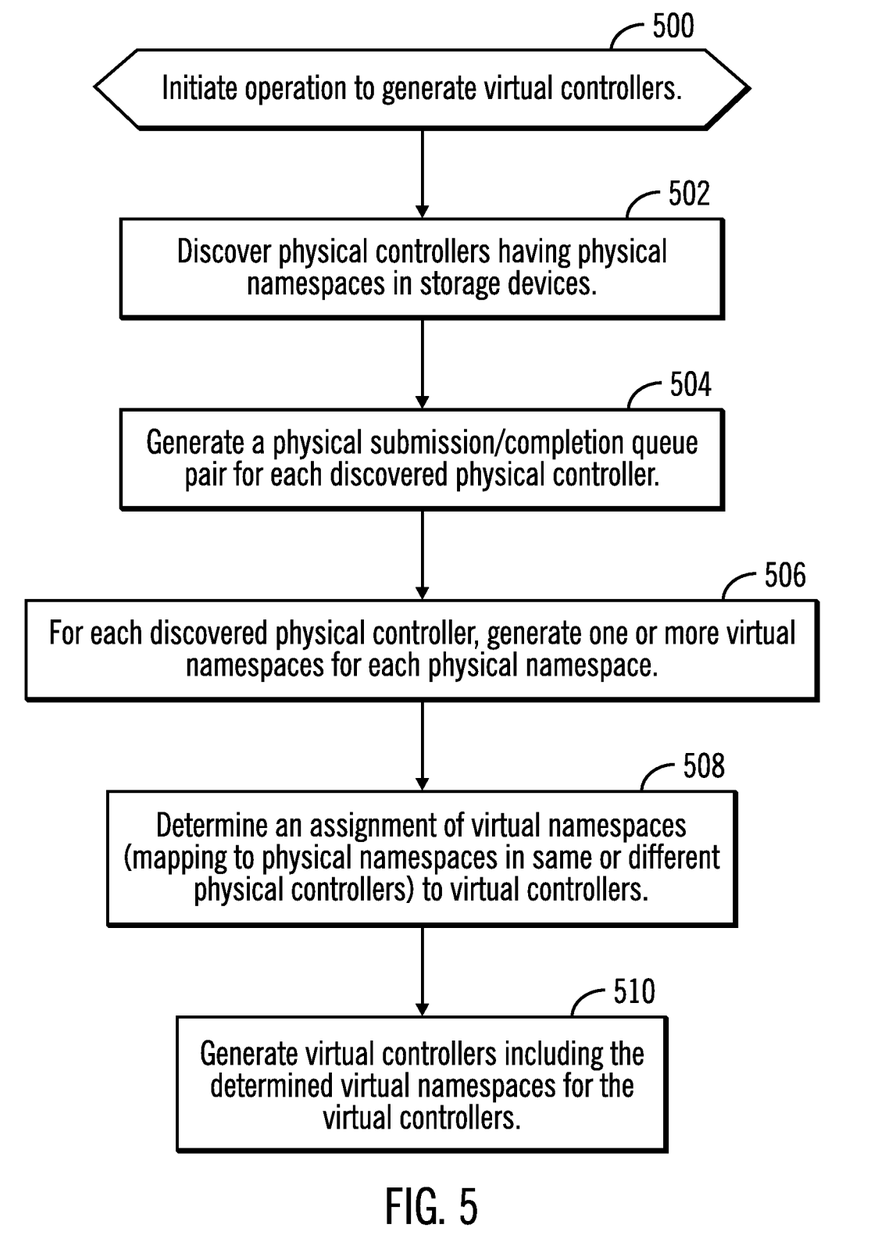
FIG. 5 illustrates an embodiment of operations to generate virtual controllers.

FIG. 5 illustrates an embodiment of operations performed by the I/O service layer 125 and/or storage driver 130 to generate virtual controllers $200_i$. The storage driver 130 discovers (at block 502) one or more physical controllers $122_i$ having physical namespaces $124_i$ in storage devices $104_i$. This discovery may occur by polling the bus 102 for new storage devices or receiving a signal when the storage device $104_i$ is coupled to the bus 102. The storage driver 130 may generate (at block 504) a physical submission queue $132_i$/physical completion queue $134_i$ pair for each discovered physical controller $122_i$. The I/O service layer 125 may then generate (at block 506), for each discovered physical controller $122_i$, one or more virtual namespace definitions $300_i$ for each physical namespace $124_i$ in the discovered physical controller $122_i$. If multiple virtual namespaces $300i$ are generated for one physical namespace $124_i$, then each of the multiple virtual namespaces $300_i$ may address a different portion of the same physical namespace $124_i$. The I/O service layer 125 may then determine (at block 508) an assignment of virtual namespaces $300_i$ (mapping to physical namespaces $124_i$ in same or different physical controllers $122_i$) to virtual controllers $200_i$. This assignment may be designated by a user through a command line, indicated in a program, entered by a user via a user interface, specified in default configuration settings, etc. The I/O service layer 125 generates (at block 510) virtual controllers $200_i$ including the determined virtual namespaces $300_i$ specified in the assignment for the virtual controllers. The virtual controller definitions 200; may initially indicate no assigned application 204 and have no virtual queues 206 yet configured.

With the embodiment of FIG. 5, a virtual controller is generated to have virtual namespaces representing physical namespaces in one or more physical controllers. In this way, the virtual controllers may be dynamically assigned to applications during operations to allow for flexible assignment of applications to the physical namespaces through a virtualization of the physical namespaces in virtual namespaces assigned to virtual controllers.

Figure 6:
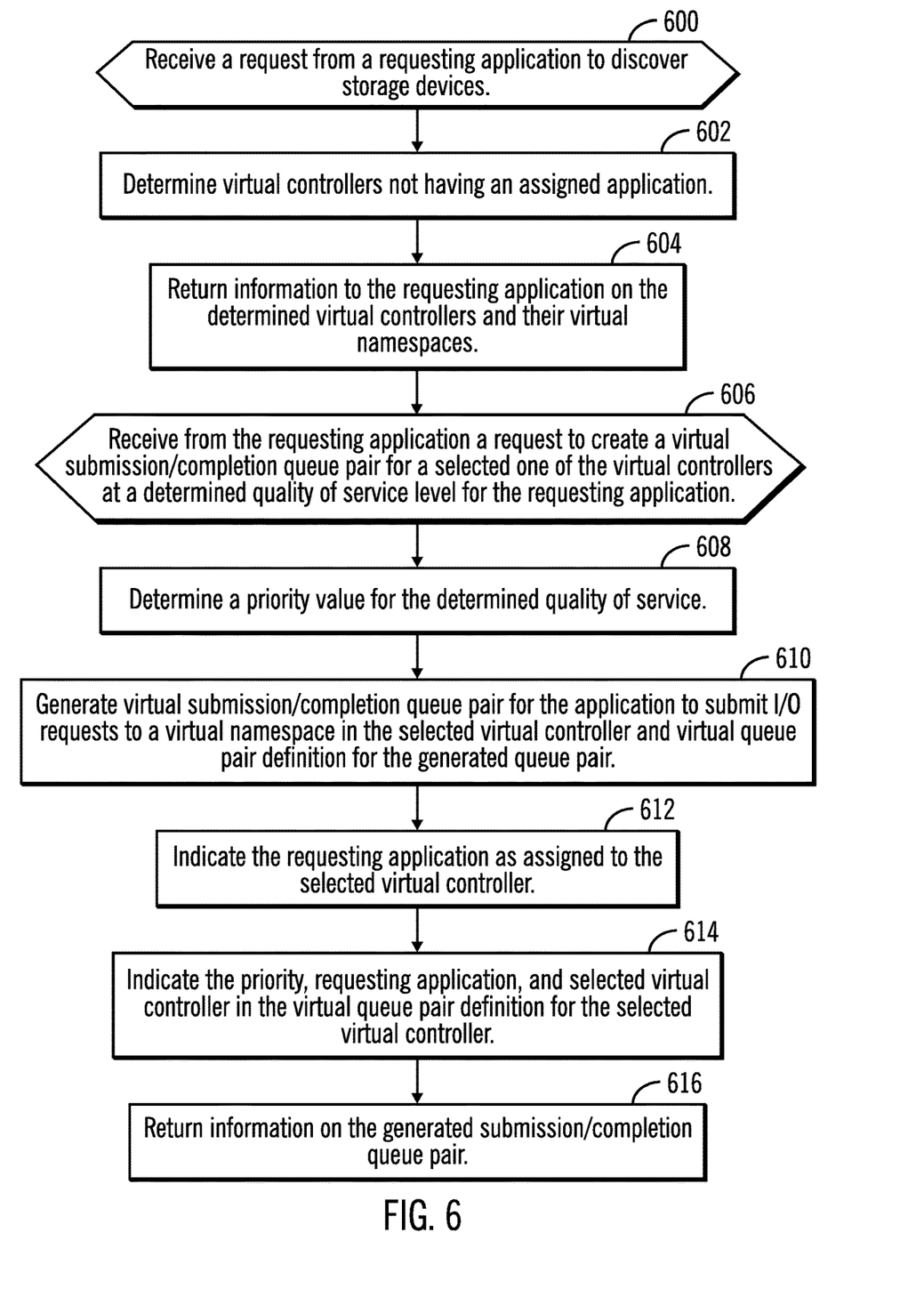
FIG. 6 illustrates an embodiment of operations to process requests from an application to discover and access storage devices.

FIG. 6 illustrates an embodiment of operations performed by the I/O service layer 125 to process a request from a requesting application $116_R$ to discover storage devices $104_1, 104_2 \ldots 104_m$, which may be made through application program interfaces (APIs) in the user space storage library $118_i$. Upon receiving (at block 600) the request, the I/O service layer 125 determines (at block 602) virtual controllers 200; not having an assigned application, such as no application indicated in field 204. The I/O service layer 125 returns (at block 604) to the requesting application $116_R$ information on the determined virtual controllers $200_i$ not having an assigned application and their assigned virtual namespaces $300_i$.

The I/O service layer 125 may then receive (at block 606) from the requesting application $116_R$, using the user space storage library $118_i$, a request to create a virtual submission/completion queue pair $126_i/128_i$ for a selected one of the virtual controllers $200_s$ at an expected quality of service level. The quality of service level may be determined by the I/O service layer 125 or some other neutral entity based on the processing needs of the requesting application $116_R$, such as I/O throughput, or an importance of the tasks performed by the requesting application $116_R$. In response, the I/O service layer 125 determines (at block 608) a priority value for the determined quality of service level and generates (at block 610) a virtual submission/completion queue pair $126_i/128_i$ for the requesting application $116_R$ to submit I/O requests to a virtual namespace $300_i$ in the selected virtual controller $200_S$, and generates a virtual queue pair definition $400_i$ for the generated virtual submission/completion queue pair $126_i/128_i$. The requesting application $116_R$ is indicated (at block 612) as assigned to the selected virtual controller $200_S$ in field 204 of the virtual controller definition $200_S$. The requesting application 116R, selected virtual controller $200_S$, and priority value are indicated (at block 614) in fields 404, 406, and 408 of the virtual queue pair definition $400_i$. Information on the generated virtual submission/completion queue pair $126_i/128_i$ is returned (at block 616) to the requesting application $116_R$ to use to submit I/O requests and receive completion acknowledgments and status.

Described embodiments allow the assignment of a virtual controller to an application to allow the application to submit I/O requests to a virtual submission queue $126_i$ for the assigned virtual controller so that the application may direct I/O requests to physical namespaces mapping to the virtual namespaces in the virtual controller assigned to the application. A quality of service level may be determined for an application $116_i$ based on throughput or I/Os at the application, such as by the I/O service layer 125 or some other neutral entity to assign quality of service levels to applications. In this way, the quality of service level assigned to an application $116_i$ may be based on I/O processing level or a priority assigned to an application, such as whether the application $116_i$ performs mission critical or less important tasks. The I/O service layer 125 may assign a priority based on the determined quality of service level for the application. The I/O service layer 125 uses the priority to determine how to access I/O requests from the virtual submission queues $126_1, 126_2 \ldots 126_m$ to add to the physical submission queues $132_1, 132_2 \ldots 132_n$ to which the virtual submission queues map. In this way the I/O service layer 125 manages the workload balancing of processing I/O requests in the virtual submission queues $126_1, 126_2 \ldots 126_m$ according to the assigned priorities. Further, by assigning virtual controllers to applications, the I/O service layer 125 is able to service multiple applications $116_1, 116_2 \ldots 116_n$ on a single host 100 so that the processing of the I/O requests are managed by the I/O service layer according to determined quality of service levels. This separates the storage device management logic from the applications because instead of applications directly submitting their requests to the storage driver, an I/O service layer 125 manages the processing of I/O requests across applications based on the quality of service levels determined for the applications and corresponding priorities assigned to the applications for submitting I/O requests. This allows the I/O service layer 125 to control the quality of service across the applications $116_1, 116_2 \ldots 116_n$ based on the processing requirements of the applications.

Further, with described embodiments, the I/O service daemon 120 operates in the user space 110, which provides improved performance benefits than operating in the kernel space 112, to manage the physical storage devices $104_1, 104_2 \ldots 104_m$. Each of the applications $116_1, 116_2 \ldots 116_n$ uses the user space storage libraries $118_1, 118_2 \ldots 118_n$ to communicate with the I/O service daemon 120, and access the storage resources through the virtual controllers.

In certain embodiments, the applications $116_1, 116_2 \ldots 116_n$ may communicate with the I/O service layer 125 using an Interprocess Communication (IPC) mechanism provided by the operating system 114, which allows the I/O service layer 125 to handle many applications $116_1, 116_2 \ldots 116_n$ requests at the same time in the user space 110.

Figure 7:
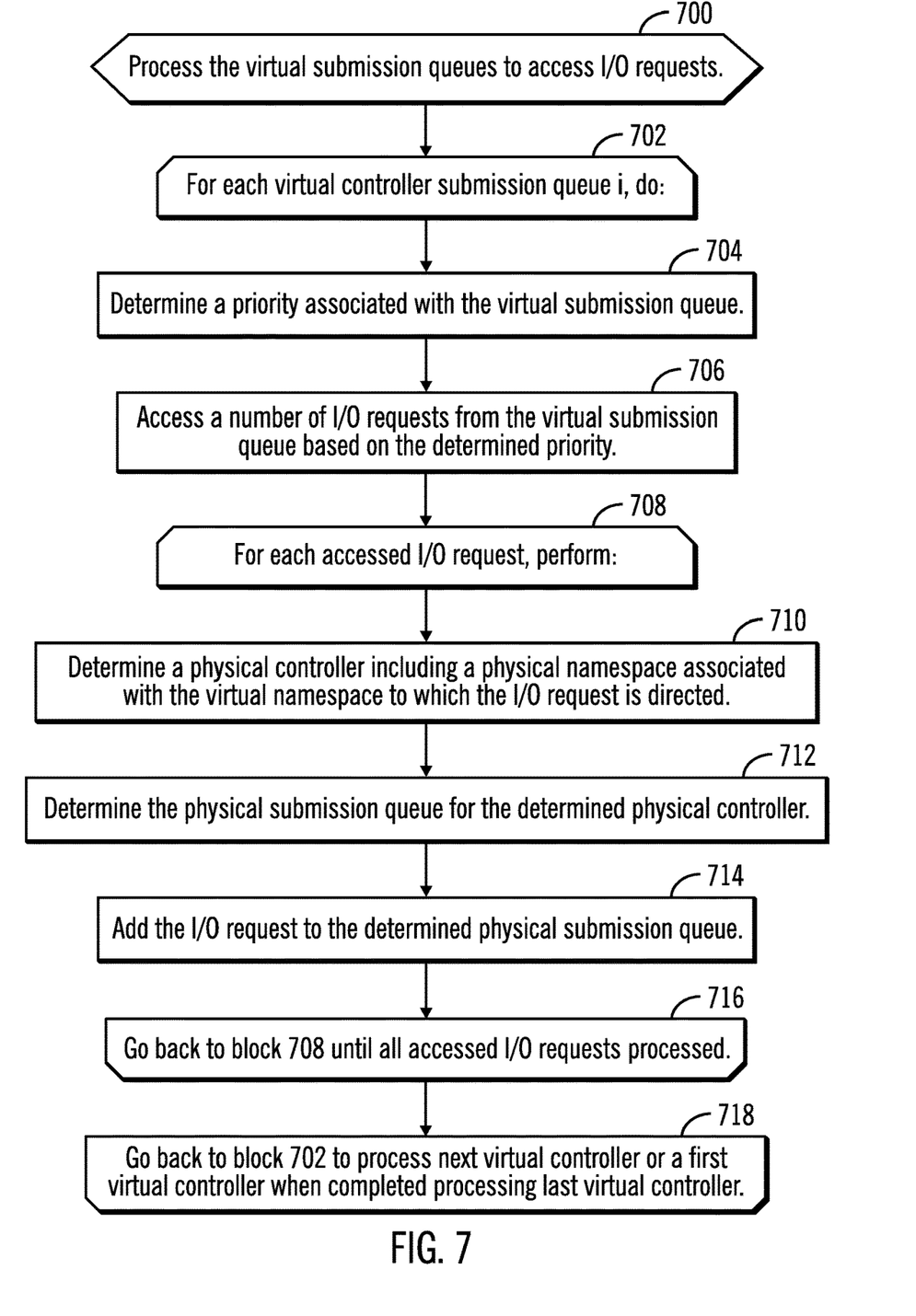
FIG. 7 illustrates an embodiment of operations to process I/O requests in virtual submission queues.

FIG. 7 illustrates an embodiment of operations performed by the I/O service layer 125 to balance the selection of I/O requests from the virtual submission queues $126_1, 126_2 \ldots 126_m$ to add to the corresponding physical submission queues $132_1, 132_2 \ldots 132_n$. The storage driver 130 may signal a physical controller 122; when an I/O request is added to a physical submission queue $132_i$ to cause the physical controller $122_i$ to retrieve I/O requests from the physical submission queue $132_i$. The I/O service layer 125 initiates operations to processes (at block 700) the virtual submission queues $126_1, 126_2 \ldots 126_n$ based on the priorities associated with the virtual submission queues $126_1, 126_2 \ldots 126_n$. For each virtual submission queue $126_i$ in the virtual queue definitions 400, the I/O service layer 125 performs a loop of operations at blocks 702 through 718. At block 702 a determination is made of a priority 408 associated with the virtual submission queue $400_i$ being considered, where the priority may indicate a number of I/O requests to process when accessing the corresponding virtual submission queue $400_i$. A number of I/O requests are accessed (at block 706) from the virtual submission queue $126_i$ identified in the virtual queue definition $400_i$ based on the determined priority 408.

A loop of operations is then performed at blocks 708 through 716 for each I/O request accessed from the virtual submission queue $126_i$. A determination is made (at block 710) of a physical controller 306 associated with the physical namespace 304 for the virtual namespace $300_i$ to which the I/O request is directed. The I/O service layer 125 determines (at block 712) the physical submission queue $132_i$ for the determined physical controller 306 and the I/O request is added (at block 714) to the determined physical submission queue $132_i$. When adding the I/O request to the physical submission queue $132_i$, the I/O service layer 125 may further call the storage driver 130 to write to a doorbell register in the physical controller $122_i$ to signal the presence of an I/O request to process.

After processing all the virtual submission queues $126_1, 126_2 \ldots 126_m$, the I/O service layer 125 may perform a round robin type algorithm and return to block 702 to process the virtual submission queues restarting from the first virtual submission queue $126_1$. In alternative embodiments, the I/O request server 126 may use the priorities in different manners to process higher priority virtual submission queues at a higher frequency than virtual submission queues having a lower priority.

With the embodiment of FIG. 7, since the I/O service layer 125 assigns virtual controllers to the applications and also maps the virtual submission queues of the virtual controllers to physical submission queues, the I/O service layer 125 can control the quality of service level each application receives based on priorities assigned to applications according to their determined quality of service levels.

An application may also terminate access to storage resources by submitting a request to destroy the a virtual submission/completion queue pair $126_i/128_i$ assigned to the application, which would then free up the virtual namespaces in the virtual controller assigned to the application for use by another application.

The described operations of the processing components, such as I/O service layer 125, applications $116_1, 116_2 \ldots 116_n$, user space storage libraries $118_1, 118_2 \ldots 118_n$, storage driver 130, operating system 114, and other components, may be implemented as a method, apparatus, device, and a computer program product comprising a computer readable storage medium implemented using standard programming and/or engineering techniques to produce software, firmware, hardware, or any combination thereof. The described operations may be implemented as code or logic maintained in a "computer readable storage medium". The term "code" and "program code" as used herein refers to software program code, hardware logic, firmware, microcode, etc. The computer readable storage medium, as that term is used herein, includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), computer encoded and readable punch cards, etc. The computer readable storage medium may further comprise a hardware device implementing firmware, microcode, etc., such as in an integrated circuit chip, a programmable logic device, a Programmable Gate Array (PGA), field-programmable gate array (FPGA), Application Specific Integrated Circuit (ASIC), etc. A computer readable storage medium is not comprised solely of transmission signals and includes physical and tangible components. Those skilled in the art will recognize that many modifications may be made to this configuration without departing from the scope of the present invention, and that the article of manufacture may comprise suitable information bearing medium known in the art.

The described data structures and information in FIGS. 1-4 are provided by way of example, and in further embodiments, certain of the described information fields may not be included and information in addition to that described may be provided.

The reference characters used herein, such as i, n, n, r, and t, and any others used herein, are used to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

Example 1 is a computer program product comprising a computer readable storage media executed in a host system in communication with a plurality of storage devices, wherein the computer readable storage media includes program code executed to: generate a plurality of virtual controllers in a host memory space, wherein each virtual controller includes at least one virtual namespace, wherein each of the at least one virtual namespace in each virtual controller maps to a physical namespace in a physical controller of one of the storage devices; assign each of a plurality of applications with a virtual controller of the virtual controllers; for each application of the applications assigned one of the virtual controllers, generate a virtual submission queue for the application to use to communicate with the virtual controller assigned to the application; and add an Input/Output (I/O) request to a target virtual namespace in one of the virtual submission queues to a physical submission queue for the physical controller having the physical namespace for which the target virtual namespace was generated.

In Example 2, the subject matter of Examples 1 and 3-10 can optionally include that the virtual controllers are maintained in a user space of a host system memory, and wherein an I/O service layer executing in the user space is to generate the virtual controllers, generate the virtual namespace for each physical namespace, indicate the application assigned to the virtual namespace, generate the virtual submission queue, process I/O request in the virtual submission queue, determine the physical submission queue and add the I/O request to the determined physical submission queue.

In Example 3, the subject matter of Examples 1, 2 and 4-10 can optionally include that each physical namespace is associated with only one virtual namespace, and wherein each virtual namespace is only assigned to one virtual controller, and wherein each virtual controller is only assigned to one of the applications.

In Example 4, the subject matter of Examples 1-3 and 4-10 can optionally include that at least one of the virtual controllers includes at least one virtual namespace that maps to at least one physical namespace in only one physical controller.

In Example 5, the subject matter of Examples 1-4 and 6-10 can optionally include that one of the virtual controllers includes a plurality of virtual namespaces that map to physical namespaces in different physical controllers to allow the application to stripe data across the physical namespaces in the different physical controllers by queueing I/O requests to the virtual namespaces in the virtual submission queue for the application and the virtual controller having the virtual namespaces that map to physical namespaces in the different physical controllers.

In Example 6, the subject matter of Examples 1-5 and 7-10 can optionally include that the program code is further executed to: process each virtual submission queue of virtual submission queues to alternate access of I/O requests from the virtual submission queues, wherein to determine the physical submission queue and add the I/O request to the determined physical submission queue is performed in response to the access of each of the I/O requests from the virtual submission queues.

In Example 7, the subject matter of Examples 1-6 and 8-10 can optionally include that to process each of the virtual submission queues is to process a fixed number of I/O requests from each of the virtual submission queues before the process of I/O requests from another of the virtual submission queues.

In Example 8, the subject matter of Examples 1-7 and 9-10 can optionally include that priorities are indicated for the applications, wherein the priorities for the applications are used to determine a frequency at which I/O requests are processed from the virtual submission queues, wherein the virtual submission queues having I/O requests from applications having a higher priority are processed at a greater frequency than the virtual submission queues having I/O requests from applications having a lower priority.

In Example 9, the subject matter of Examples 1-8 and 10 can optionally include that the program code is further executed to: receive a first request from a requesting application to discover storage devices; return, to the requesting application, information on the virtual controllers and virtual namespaces in the virtual controllers in response to the first request; receive a second request by the requesting application to create a virtual submission queue for a selected virtual controller of the virtual controllers indicated in the returned information: generating a virtual submission queue for the selected virtual controller for the requesting application to use in response to the second request: and assigning to the requesting application the selected virtual controller with indication of an assigned priority based on a quality of service level determined for the application, wherein the requesting application submits I/O requests in the virtual submission queue to be processed at a frequency corresponding to the assigned priority.

In Example 10, the subject matter of Examples 1-9 can optionally include that the program code is further executed to: determine at least one virtual controller not assigned to an application in response to the first request from the requesting application, wherein the information returned to the requesting application on the virtual controllers and virtual namespaces comprises only the determined at least one virtual controller not assigned to an application.

Example 11 is a system in communication with a plurality of storage devices, comprising: a processor; and a computer readable storage media including program code that the processor executes to: generate a plurality of virtual controllers in a memory space, wherein each virtual controller includes at least one virtual namespace, wherein each of the at least one virtual namespace in each virtual controller maps to a physical namespace in a physical controller of one of the storage devices: assign each of a plurality of applications with a virtual controller of the virtual controllers; for each application of the applications assigned one of the virtual controllers, generate a virtual submission queue for the application to use to communicate with the virtual controller assigned to the application; and add an Input/Output (I/O) request to a target virtual namespace in one of the virtual submission queues to a physical submission queue for the physical controller having the physical namespace for which the target virtual namespace was generated.

In Example 12, the subject matter of Examples 11 and 13-18 can optionally include that the virtual controllers are maintained in a user space of a host system memory, and wherein an I/O service layer executing in the user space is to generate the virtual controllers, generate the virtual namespace for each physical namespace, indicate the application assigned to the virtual namespace, generate the virtual submission queue, process I/O request in the virtual submission queue, determine the physical submission queue and add the I/O request to the determined physical submission queue.

In Example 13, the subject matter of Examples 11, 12 and 14-18 can optionally include that each physical namespace is associated with only one virtual namespace, and wherein each virtual namespace is only assigned to one virtual controller, and wherein each virtual controller is only assigned to one of the applications.

In Example 14, the subject matter of Examples 11-13 and 15-18 can optionally include that at least one of the virtual controllers includes at least one virtual namespace that maps to at least one physical namespace in only one physical controller.

In Example 15, the subject matter of Examples 11-14 and 16-18 can optionally include that one of the virtual controllers includes a plurality of virtual namespaces that map to physical namespaces in different physical controllers to allow the application to stripe data across the physical namespaces in the different physical controllers by queueing I/O requests to the virtual namespaces in the virtual submission queue for the application and the virtual controller having the virtual namespaces that map to physical namespaces in the different physical controllers.

In Example 16, the subject matter of Examples 11-15 and 17-18 can optionally include that the program code is further executed to: process each virtual submission queue of virtual submission queues to alternate access of I/O requests from the virtual submission queues, wherein to determine the physical submission queue and add the I/O request to the determined physical submission queue is performed in response to the access of each of the I/O requests from the virtual submission queues.

In Example 17, the subject matter of Examples 11-16 and 18 can optionally include that priorities are indicated for the applications, wherein the priorities for the applications are used to determine a frequency at which I/O requests are processed from the virtual submission queues, wherein the virtual submission queues having I/O requests from applications having a higher priority are processed at a greater frequency than the virtual submission queues having I/O requests from applications having a lower priority.

In Example 18, the subject matter of Examples 11-17 can optionally include that the program code is further executed to: receive a first request from a requesting application to discover storage devices; return, to the requesting application, information on the virtual controllers and virtual namespaces in the virtual controllers in response to the first request; receive a second request by the requesting application to create a virtual submission queue for a selected virtual controller of the virtual controllers indicated in the returned information: generating a virtual submission queue for the selected virtual controller for the requesting application to use in response to the second request: and assigning to the requesting application the selected virtual controller with indication of an assigned priority based on a quality of service level determined for the application, wherein the requesting application submits I/O requests in the virtual submission queue to be processed at a frequency corresponding to the assigned priority.

Example 19 is a method for communicating with a plurality of storage devices, comprising: generating a plurality of virtual controllers in a host memory space, wherein each virtual controller includes at least one virtual namespace, wherein each of the at least one virtual namespace in each virtual controller maps to a physical namespace in a physical controller of one of the storage devices: assigning each of a plurality of applications with a virtual controller of the virtual controllers; for each application of the applications assigned one of the virtual controllers, generating a virtual submission queue for the application to use to communicate with the virtual controller assigned to the application; and adding an Input/Output (I/O) request to a target virtual namespace in one of the virtual submission queues to a physical submission queue for the physical controller having the physical namespace for which the target virtual namespace was generated.

In Example 20, the subject matter of Examples 19 and 21-25 can optionally include that the virtual controllers are maintained in a user space of a host system memory, and wherein an I/O service layer executing in the user space is to generate the virtual controllers, generate the virtual namespace for each physical namespace, indicate the application assigned to the virtual namespace, generate the virtual submission queue, process I/O request in the virtual submission queue, determine the physical submission queue and add the I/O request to the determined physical submission queue.

In Example 21, the subject matter of Examples 19, 20 and 22-25 can optionally include that each physical namespace is associated with only one virtual namespace, and wherein each virtual namespace is only assigned to one virtual controller, and wherein each virtual controller is only assigned to one of the applications.

In Example 22, the subject matter of Examples 19-21 and 23-25 can optionally include that at least one of the virtual controllers includes at least one virtual namespace that maps to at least one physical namespace in only one physical controller.

In Example 23, the subject matter of Examples 19-22 and 24-25 can optionally include that one of the virtual controllers includes a plurality of virtual namespaces that map to physical namespaces in different physical controllers to allow the application to stripe data across the physical namespaces in the different physical controllers by queueing I/O requests to the virtual namespaces in the virtual submission queue for the application and the virtual controller having the virtual namespaces that map to physical namespaces in the different physical controllers.

In Example 24, the subject matter of Examples 19-23 and 25 can optionally include processing each virtual submission queue of virtual submission queues to alternate access of I/O requests from the virtual submission queues, wherein to determine the physical submission queue and add the I/O request to the determined physical submission queue is performed in response to the access of each of the I/O requests from the virtual submission queues.

In Example 25, the subject matter of Examples 19-24 can optionally include priorities are indicated for the applications, wherein the priorities for the applications are used to determine a frequency at which I/O requests are processed from the virtual submission queues, wherein the virtual submission queues having I/O requests from applications having a higher priority are processed at a greater frequency than the virtual submission queues having I/O requests from applications having a lower priority.

Example 26 is an apparatus including a computer readable storage media including program code and in communication with a plurality of storage devices to: generate a plurality of virtual controllers in a host memory space, wherein each virtual controller includes at least one virtual namespace, wherein each of the at least one virtual namespace in each virtual controller maps to a physical namespace in a physical controller of one of the storage devices; assign each of a plurality of applications with a virtual controller of the virtual controllers; for each application of the applications assigned one of the virtual controllers, generate a virtual submission queue for the application to use to communicate with the virtual controller assigned to the application; and add an Input/Output (I/O) request to a target virtual namespace in one of the virtual submission queues to a physical submission queue for the physical controller having the physical namespace for which the target virtual namespace was generated.

In Example 27, the subject matter of Examples 26 and 28-35 can optionally include that the virtual controllers are maintained in a user space of a host system memory, and wherein an I/O service layer executing in the user space is to generate the virtual controllers, generate the virtual namespace for each physical namespace, indicate the application assigned to the virtual namespace, generate the virtual submission queue, process I/O request in the virtual submission queue, determine the physical submission queue and add the I/O request to the determined physical submission queue.

In Example 28, the subject matter of Examples 26, 27 and 29-35 can optionally include that each physical namespace is associated with only one virtual namespace, and wherein each virtual namespace is only assigned to one virtual controller, and wherein each virtual controller is only assigned to one of the applications.

In Example 29, the subject matter of Examples 26-28 and 30-35 can optionally include that at least one of the virtual controllers includes at least one virtual namespace that maps to at least one physical namespace in only one physical controller.

In Example 30, the subject matter of Examples 26-29 and 31-35 can optionally include that one of the virtual controllers includes a plurality of virtual namespaces that map to physical namespaces in different physical controllers to allow the application to stripe data across the physical namespaces in the different physical controllers by queueing I/O requests to the virtual namespaces in the virtual submission queue for the application and the virtual controller having the virtual namespaces that map to physical namespaces in the different physical controllers.

In Example 31, the subject matter of Examples 26-30 and 32-35 can optionally include that the program code is further executed to: process each virtual submission queue of virtual submission queues to alternate access of I/O requests from the virtual submission queues, wherein to determine the physical submission queue and add the I/O request to the determined physical submission queue is performed in response to the access of each of the I/O requests from the virtual submission queues.

In Example 32, the subject matter of Examples 26-31 and 33-35 can optionally include that to process each of the virtual submission queues is to process a fixed number of I/O requests from each of the virtual submission queues before the process of I/O requests from another of the virtual submission queues.

In Example 33, the subject matter of Examples 26-32 and 34-35 can optionally include that priorities are indicated for the applications, wherein the priorities for the applications are used to determine a frequency at which I/O requests are processed from the virtual submission queues, wherein the virtual submission queues having I/O requests from applications having a higher priority are processed at a greater frequency than the virtual submission queues having I/O requests from applications having a lower priority.

In Example 34, the subject matter of Examples 26-33 and 35 can optionally include that the program code is further executed to: receive a first request from a requesting application to discover storage devices; return, to the requesting application, information on the virtual controllers and virtual namespaces in the virtual controllers in response to the first request; receive a second request by the requesting application to create a virtual submission queue for a selected virtual controller of the virtual controllers indicated in the returned information; generating a virtual submission queue for the selected virtual controller for the requesting application to use in response to the second request; and assigning to the requesting application the selected virtual controller with indication of an assigned priority based on a quality of service level determined for the application, wherein the requesting application submits I/O requests in the virtual submission queue to be processed at a frequency corresponding to the assigned priority.

In Example 35, the subject matter of Examples 26-34 can optionally include that the program code is further executed to: determine at least one virtual controller not assigned to an application in response to the first request from the requesting application, wherein the information returned to the requesting application on the virtual controllers and virtual namespaces comprises only the determined at least one virtual controller not assigned to an application.

Example 36 is an apparatus, comprising: means for generating a plurality of virtual controllers in a host memory space, wherein each virtual controller includes at least one virtual namespace, wherein each of the at least one virtual namespace in each virtual controller maps to a physical namespace in a physical controller of one of a plurality of storage devices; means for assigning each of a plurality of applications with a virtual controller of the virtual controllers; means for generating, for each application of the applications assigned one of the virtual controllers, a virtual submission queue for the application to use to communicate with the virtual controller assigned to the application; means for adding an Input/Output (I/O) request to a target virtual namespace in one of the virtual submission queues to a physical submission queue for the physical controller having the physical namespace for which the target virtual namespace was generated.

Example 37 is an apparatus comprising means to perform a method as claimed in any preceding claim.

Example 38 is a machine-readable storage including machine-readable instructions, when executed, to implement a method or realize an apparatus as claimed in any preceding claim.

What is claimed is:

1. A computer program product comprising a non-transitory computer readable storage media executed in a host system in communication with a plurality of storage devices, wherein the computer readable storage media includes program code executed to:
   generate a plurality of virtual controllers in a host memory space, wherein each virtual controller includes at least one virtual namespace, wherein each of the at least one virtual namespace in each virtual controller maps to a physical namespace in a respective physical controller of one storage device from among the plurality of storage devices;
   assign each of a plurality of applications to a respective virtual controller of the virtual controllers;
   for each application of the applications assigned to one of the virtual controllers, generate a virtual submission queue for the application to use to communicate with the respective virtual controller assigned to the application;
   add an Input/Output (I/O) request to a target virtual namespace in one of the virtual submission queues to a physical submission queue for the respective physical controller having the physical namespace for which the target virtual namespace was generated; and
   process each virtual submission queue of the virtual submission queues to alternate access of I/O requests from the virtual submission queues, wherein to determine the physical submission queue and add the I/O request to the determined physical submission queue is performed in response to the access of each of the I/O requests from the virtual submission queues.

2. The computer program product of claim 1, wherein the plurality of virtual controllers are maintained in a user space of the host memory space, and wherein an I/O service layer executing in the user space is to generate the plurality of virtual controllers, generate the virtual namespace for each physical namespace, indicate the application assigned to the virtual namespace, generate the virtual submission queue, process the I/O request in the virtual submission queue, determine the physical submission queue and add the I/O request to the determined physical submission queue.

3. The computer program product of claim 1, wherein each physical namespace is associated with only one virtual namespace, and wherein each virtual namespace is only assigned to one virtual controller, and wherein each virtual controller is only assigned to one of the applications.

4. The computer program product of claim 1, wherein one of the plurality of virtual controllers includes a plurality of virtual namespaces that map to physical namespaces in different physical controllers to allow the application to stripe data across the physical namespaces in the different physical controllers by queueing I/O requests to the virtual namespaces in the virtual submission queue for the application and the virtual controller having the virtual namespaces that map to physical namespaces in the different physical controllers.

5. The computer program product of claim 4, wherein to process each of the virtual submission queues is to process a fixed number of I/O requests from each of the virtual submission queues before the process of I/O requests from another of the virtual submission queues.

6. The computer program product of claim 4, wherein priorities are indicated for the applications, wherein the priorities for the plurality of applications are used to determine a frequency at which I/O requests are processed from the virtual submission queues, wherein virtual submission queues having an I/O request from applications having a higher priority are processed at a greater frequency than the virtual submission queues having an I/O request from applications having a lower priority.

7. The computer program product of claim 1, wherein the program code is further executed to:
receive a first request from a requesting application to discover storage devices;
return, to the requesting application, information on the plurality of virtual controllers and virtual namespaces in the plurality of virtual controllers in response to the first request;
receive a second request by the requesting application to create a virtual submission queue for a selected virtual controller of the virtual controllers indicated in the returned information;
generating a virtual submission queue for the selected virtual controller for the requesting application to use in response to the second request; and
assigning to the requesting application the selected virtual controller with indication of an assigned priority based on a quality of service level determined for the application, wherein the requesting application submits I/O requests in the virtual submission queue to be processed at a frequency corresponding to the assigned priority.

8. The computer program product of claim 7, wherein the program code is further executed to:
determine at least one virtual controller not assigned to an application in response to the first request from the requesting application, wherein information returned to the requesting application on the plurality of virtual controllers and virtual namespaces comprises only the determined at least one virtual controller not assigned to an application.

9. A system in communication with a plurality of storage devices, comprising:
a processor; and
a computer readable storage media including program code that the processor executes to:
generate a plurality of virtual controllers in a host memory space, wherein each virtual controller includes at least one virtual namespace, wherein each of the at least one virtual namespace in each virtual controller maps to a physical namespace in a respective physical controller of one storage device from among the plurality of storage devices;
assign each of a plurality of applications to a respective virtual controller of the virtual controllers;
for each application of the applications assigned to one of the virtual controllers, generate a virtual submission queue for the application to use to communicate with the respective virtual controller assigned to the application;
add an Input/Output (I/O) request to a target virtual namespace in one of the virtual submission queues to a physical submission queue for the respective physical controller having the physical namespace for which the target virtual namespace was generated; and
process each virtual submission queue of the virtual submission queues to alternate access of I/O requests from the virtual submission queues, wherein to determine the physical submission queue and add the I/O request to the determined physical submission queue is performed in response to the access of each of the I/O requests from the virtual submission queues.

10. The system of claim 9, wherein the plurality of virtual controllers are maintained in a user space of the host memory space, and wherein an I/O service layer executing in the user space is to generate the plurality of virtual controllers, generate the virtual namespace for each physical namespace, indicate the application assigned to the virtual namespace, generate the virtual submission queue, process the I/O request in the virtual submission queue, determine the physical submission queue and add the I/O request to the determined physical submission queue.

11. The system of claim 9, wherein each physical namespace is associated with only one virtual namespace, and wherein each virtual namespace is only assigned to one virtual controller, and wherein each virtual controller is only assigned to one of the applications.

12. The system of claim 9, wherein one of the plurality of virtual controllers includes a plurality of virtual namespaces that map to physical namespaces in different physical controllers to allow the application to stripe data across the physical namespaces in the different physical controllers by queueing I/O requests to the virtual namespaces in the virtual submission queue for the application and the virtual controller having the virtual namespaces that map to physical namespaces in the different physical controllers.

13. The system of claim 9, wherein priorities are indicated for the applications, wherein the priorities for the plurality of applications are used to determine a frequency at which I/O requests are processed from the virtual submission queues, wherein virtual submission queues having an I/O request from applications having a higher priority are processed at a greater frequency than the virtual submission queues having an I/O request from applications having a lower priority.

14. The system of claim 9, wherein the program code is further executed to:

receive a first request from a requesting application to discover storage devices;

return, to the requesting application, information on the plurality of virtual controllers and virtual namespaces in the plurality of virtual controllers in response to the first request;

receive a second request by the requesting application to create a virtual submission queue for a selected virtual controller of the virtual controllers indicated in the returned information;

generating a virtual submission queue for the selected virtual controller for the requesting application to use in response to the second request; and assigning to the requesting application the selected virtual controller with indication of an assigned priority based on a quality of service level determined for the application, wherein the requesting application submits I/O requests in the virtual submission queue to be processed at a frequency corresponding to the assigned priority.

15. A method for communicating with a plurality of storage devices, comprising:

generating a plurality of virtual controllers in a host memory space, wherein each virtual controller includes at least one virtual namespace, wherein each of the at least one virtual namespace in each virtual controller maps to a physical namespace in a respective physical controller of one storage device from among the plurality of storage devices;

assigning each of a plurality of applications to a respective virtual controller of the virtual controllers;

for each application of the applications assigned to one of the virtual controllers, generating a virtual submission queue for the application to use to communicate with the respective virtual controller assigned to the application;

adding an Input/Output (I/O) request to a target virtual namespace in one of the virtual submission queues to a physical submission queue for the respective physical controller having the physical namespace for which the target virtual namespace was generated; and processing each virtual submission queue of the virtual submission queues to alternate access of I/O requests from the virtual submission queues, wherein to determine the physical submission queue and add the I/O request to the determined physical submission queue is performed in response to the access of each of the I/O requests from the virtual submission queues.

16. The method of claim 15, wherein the plurality of virtual controllers are maintained in a user space of the host memory space, and wherein an I/O service layer executing in the user space is to generate the plurality of virtual controllers, generate the virtual namespace for each physical namespace, indicate the application assigned to the virtual namespace, generate the virtual submission queue, process the I/O request in the virtual submission queue, determine the physical submission queue and add the I/O request to the determined physical submission queue.

17. The method of claim 15, wherein each physical namespace is associated with only one virtual namespace, and wherein each virtual namespace is only assigned to one virtual controller, and wherein each virtual controller is only assigned to one of the applications.

18. The method of claim 15, wherein one of the plurality of virtual controllers includes a plurality of virtual namespaces that map to physical namespaces in different physical controllers to allow the application to stripe data across the physical namespaces in the different physical controllers by queueing I/O requests to the virtual namespaces in the virtual submission queue for the application and the virtual controller having the virtual namespaces that map to physical namespaces in the different physical controllers.

\* \* \* \* \*